March 7, 1939. L. A. STINSON 2,149,984
AUTOMATIC SHOW CARD PRINTING DEVICE
Filed Sept. 11, 1936 8 Sheets-Sheet 3

INVENTOR.
LYMAN A. STINSON
BY Harry H. Hitzeman
ATTORNEY.

March 7, 1939.  L. A. STINSON  2,149,984
AUTOMATIC SHOW CARD PRINTING DEVICE
Filed Sept. 11, 1936  8 Sheets-Sheet 7

INVENTOR:
LYMAN A. STINSON
BY Harry H. Hitzeman
ATTY.

March 7, 1939.  L. A. STINSON  2,149,984
AUTOMATIC SHOW CARD PRINTING DEVICE
Filed Sept. 11, 1936  8 Sheets—Sheet 8

INVENTOR:
LYMAN A. STINSON
BY Harry H. Hitzeman
ATTY.

Patented Mar. 7, 1939

2,149,984

UNITED STATES PATENT OFFICE 2,149,984

AUTOMATIC SHOW CARD PRINTING DEVICE

Lyman A. Stinson, Chicago, Ill., assignor of one-half to James L. Allen, Wilmette, Ill.

Application September 11, 1936
Serial No. 100,239½

18 Claims. (Cl. 197—2)

My invention relates to show-card printing apparatus. My invention relates more particularly to an automatic show-card printing machine and has for an object the provision of an apparatus of this type adapted to be easily and conveniently operated.

One of the objects of my invention is to produce a simple, practical and advantageous construction of show-card printing machine or like device.

A further object of the invention is to provide a show-card printing machine capable of printing upon show-cards of all standard sizes, as well as upon show-cards of unusual sizes, without the necessity of changing the apparatus in any particular.

A further object of the invention is to provide a show-card printing apparatus having a rotatable dial for supporting type thereon.

A further object of the invention is to provide a show-card printing apparatus having a rotatable dial provided with a plurality of sets of type-holders so that any one of a plurality of different style types may be employed without the necessity of removing or changing parts of the machine.

A further object of the invention is to provide improved type carrying means so that in the event type is broken or must be replaced for other reasons, the type itself may be easily removed or changed without the necessity of dismantling the machine or causing any undue labor.

A further object of the invention is to provide an improved spacing means in a machine of this type.

A further object of the invention is to provide improved spacing means by the use of which automatic adjustment is secured in using type of any one of several sizes, and whereby the automatic spacing of wide, narrow or intermediate type is automatically accomplished.

A further object of the invention is to provide an improved power-driven printing machine of the type specified capable of printing upon show-cards with great rapidity.

Other objects and advantages of the present invention will be more apparent from the following description wherein reference is had to the accompanying eight sheets of drawings upon which—

Figure 1:
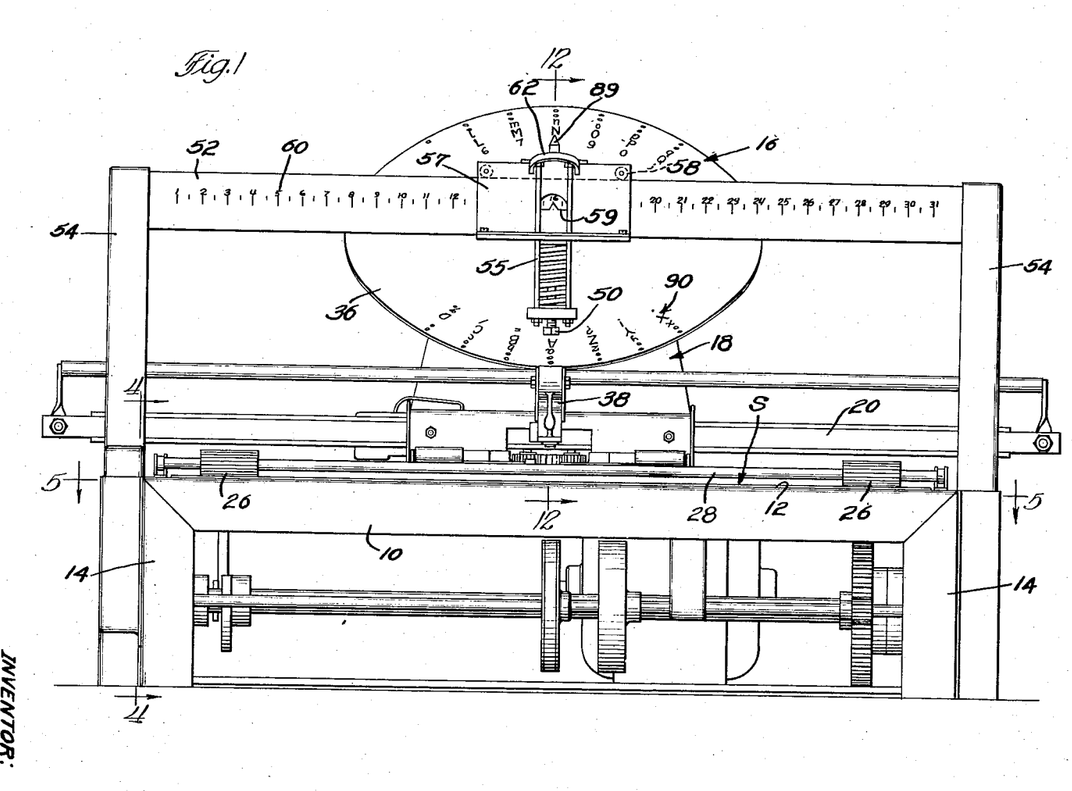
Fig. 1 is a front elevational view of the complete machine.
Figure 2:
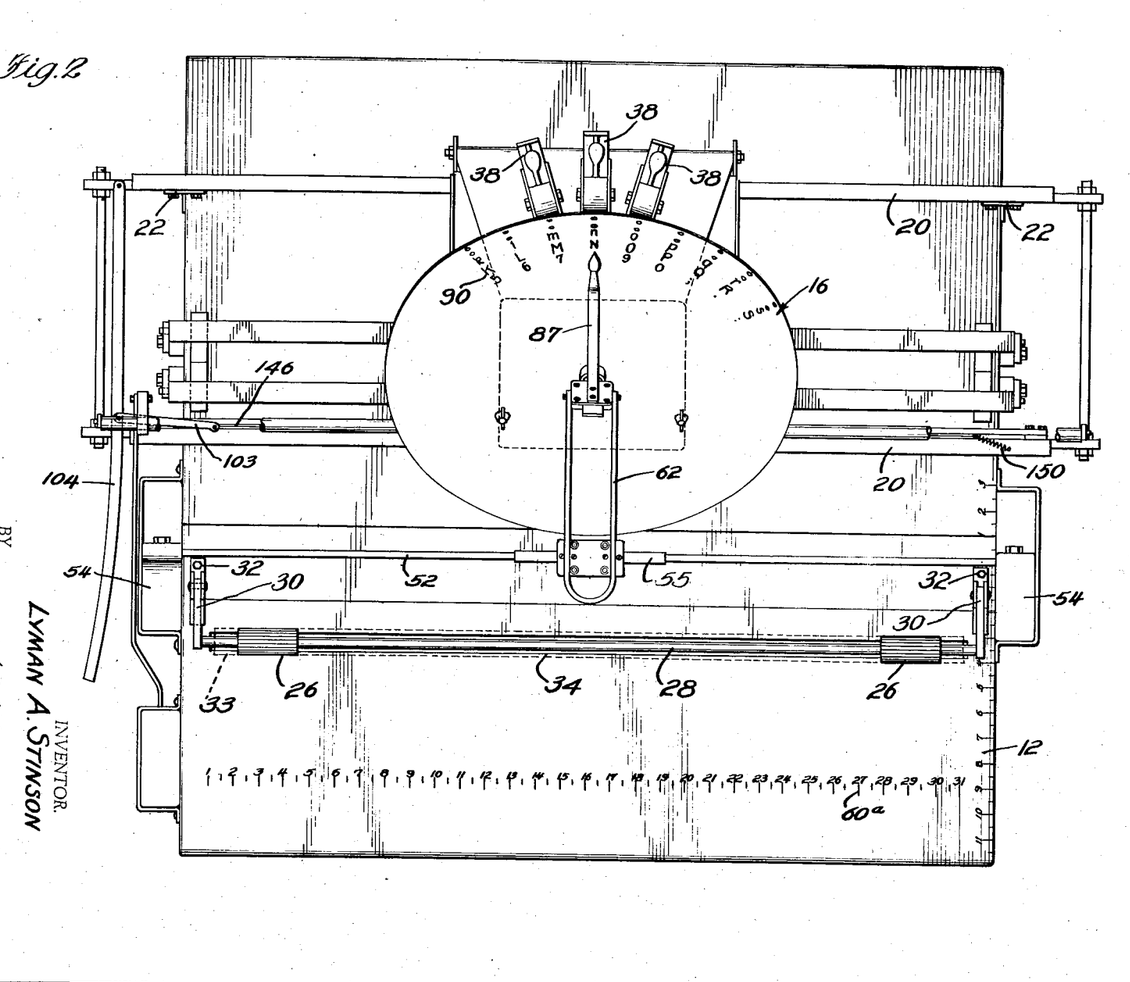
Fig. 2 is a plan view thereof.
Figure 3:
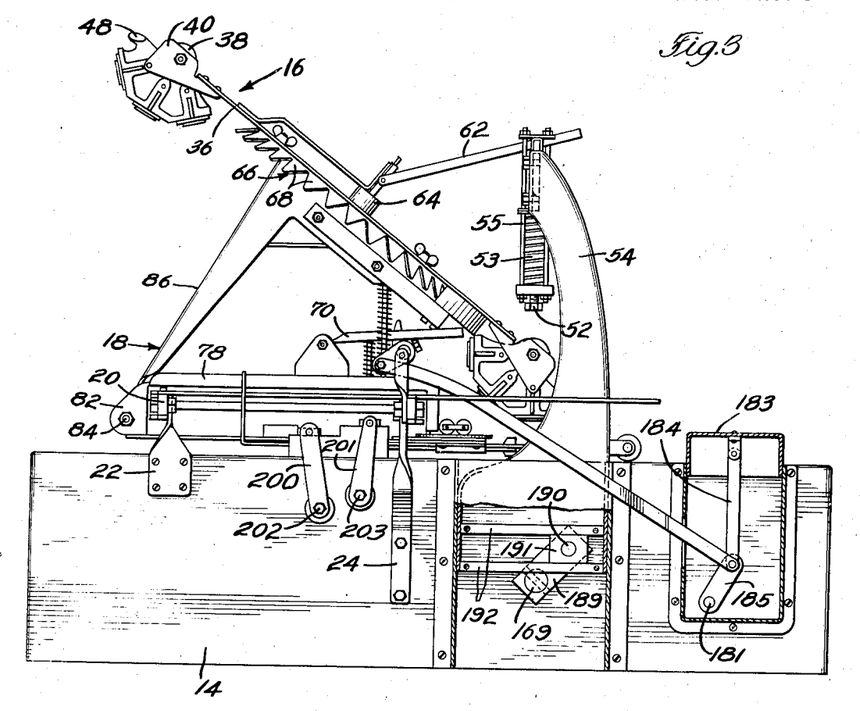
Fig. 3 is a side elevational view looking from the left-hand side of Fig. 2 and having a portion thereof broken in section to more clearly show some of the parts.

As shown generally in Figs. 1, 2 and 3, the apparatus may comprise a rectangularly-shaped base member 10, provided with an upper flat table portion 12, and the upright side walls 14 upon two sides thereof. The base may be constructed of sheet metal, as shown, or in any other desirable or suitable manner. The power-driven operating mechanism is all adapted to be mounted within the box-like base beneath the top 12 thereof.

The printing mechanism designated generally by the number 16 is mounted upon a carriage 18 that is supported above the table 12 upon the horizontal cross-rails 20. The rails 20 are positioned a spaced distance above the table upon suitable support members 22 and 24.

Means for holding a show-card below the printing apparatus, later to be described, are provided, and comprise the spring pressed holding rollers 26 slidably mounted upon a cross-rod 28 which is carried at its ends by the arms 30. The arms 30 are pivotally mounted in suitable brackets 32 fastened to the top 12 adjacent the sides thereof.

Figure 4:
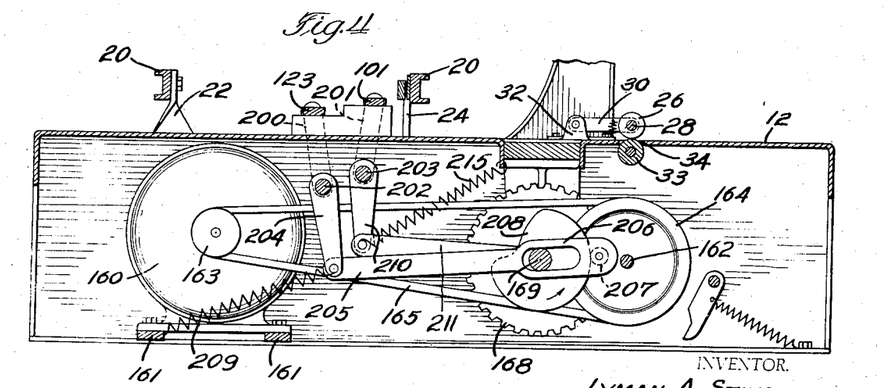
Fig. 4 is a fragmentary vertical sectional view showing part of the drive mechanism, and is taken on the line 4—4 of Fig. 1.
Figure 5:
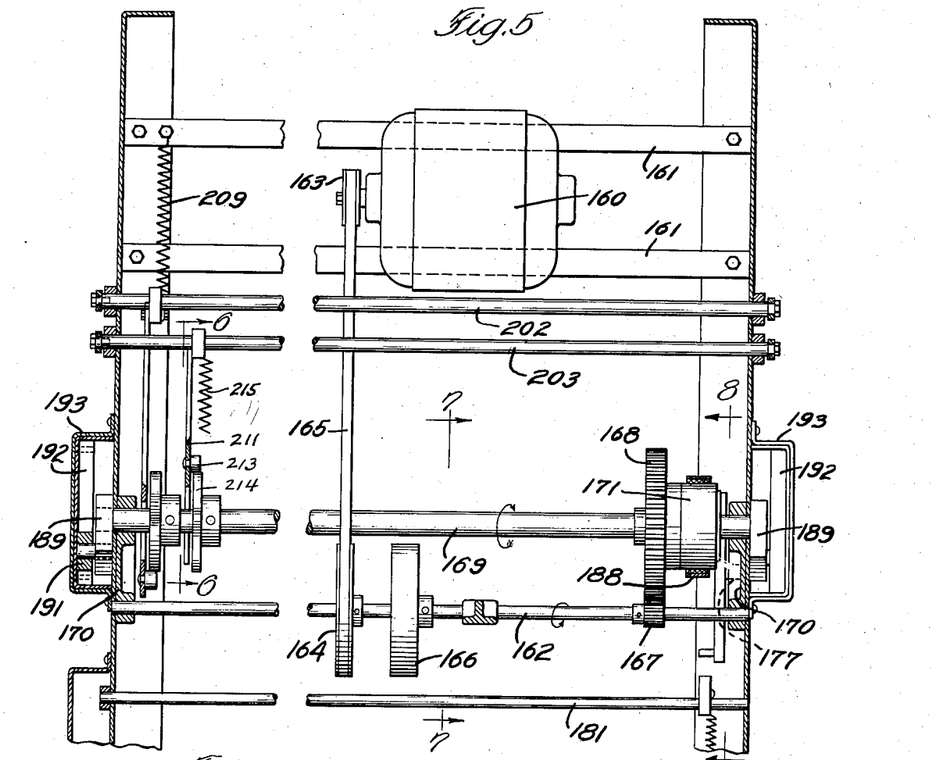
Fig. 5 is a plan sectional view illustrating generally the drive mechanism and is taken generally on the line 5—5 of Fig. 1.
Figure 6:
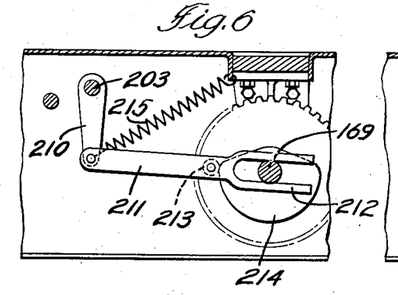
Fig. 6 is a fragmentary sectional view through the base, taken generally on the line 6—6 of Fig. 5.
Figure 7:
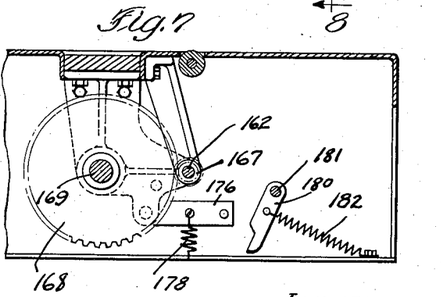
Fig. 7 is a similar fragmentary view showing a different portion of the drive, and is taken generally on the line 7—7 of Fig. 5.
Figure 8:
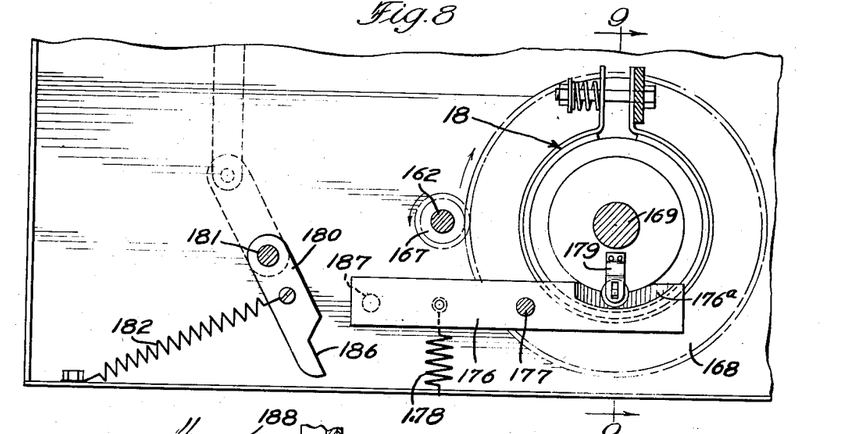
Fig. 8 is a similar enlarged sectional view showing the clutch control mechanism and is taken generally on the line 8—8 of Fig. 5.

A suitable bottom roller 33, shown in dotted lines in Fig. 2 and also shown in Fig. 4, is positioned below the top 12 and extends through an opening 34 therein, to provide frictional contact for moving the show-card S (where shown) forward into printing position below the type.

The apparatus for printing upon the show-card, placed into position as described, comprises briefly the carriage 18, upon which a type-carrying disc 36 is rotatably mounted. The type-carrying disc has a plurality of type holders 38 secured thereto, carried around the disc's peripheral edge, upon individual bracket members 40. Each of the type carriers 38 is provided with a plurality of radial slots 42 and faces 44. Individual type members 46 are adapted to be held in position in the slots 42 against the faces 44 of the type carrier. The type members may be in the form of a T having the printing impression member 46a upon the face of the portion 46 thereof which lies upon the face 44 of the type carrier. The type carrier 38 is adapted to be held in the position shown, with the extreme type member facing downwardly, or with any of the others facing downwardly, by means of a bump upon the bracket 40, which co-operates with the apertures 47 upon the sides of the type carrier 38. A hand grip member 48 is provided upon the type carrier, to move the same to bring the desired type into printing position.

Figure 12:
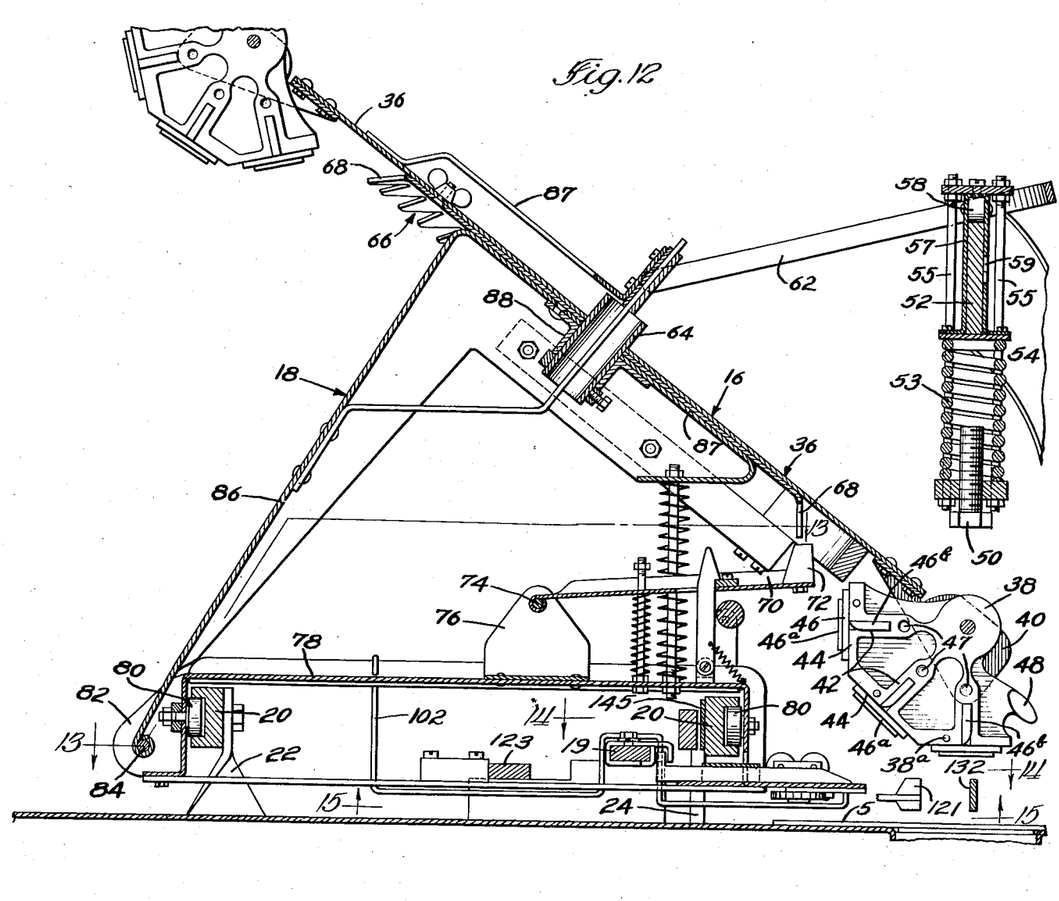
Fig. 12 is an enlarged fragmentary, central, vertical section showing the carriage and associated parts, and is taken generally on the line 12—12 of Fig. 1.

I provide a hammer member 50 directly above the type carrier 38 in the printing position shown in Fig. 12, which is carried by a cross-bar 52 extending from the side bracket members 54. The hammer is adapted to be spring-supported below the cross-member 52 upon a relatively heavy coil spring 53, which is vertically positioned between a plurality of upright guide members 55. The guide members are secured to a hammer carriage 57 which is slidably mounted upon the cross-bar 52 and rides thereon by means of suitable rollers 58. The carriage has a side opening 59 in the forward wall thereof, and an indicator formed therein to provide for positioning the hammer at a desired point, in accordance with a scale 60 provided on the side of the cross-bar 52. A U-shaped strap member 62 is connected to the carriage 57 and extends to the type carriage 16. The purpose of this is to provide that the hammer and the type carriage will always travel to and fro over the table in proper relation to each other.

Figure 13:
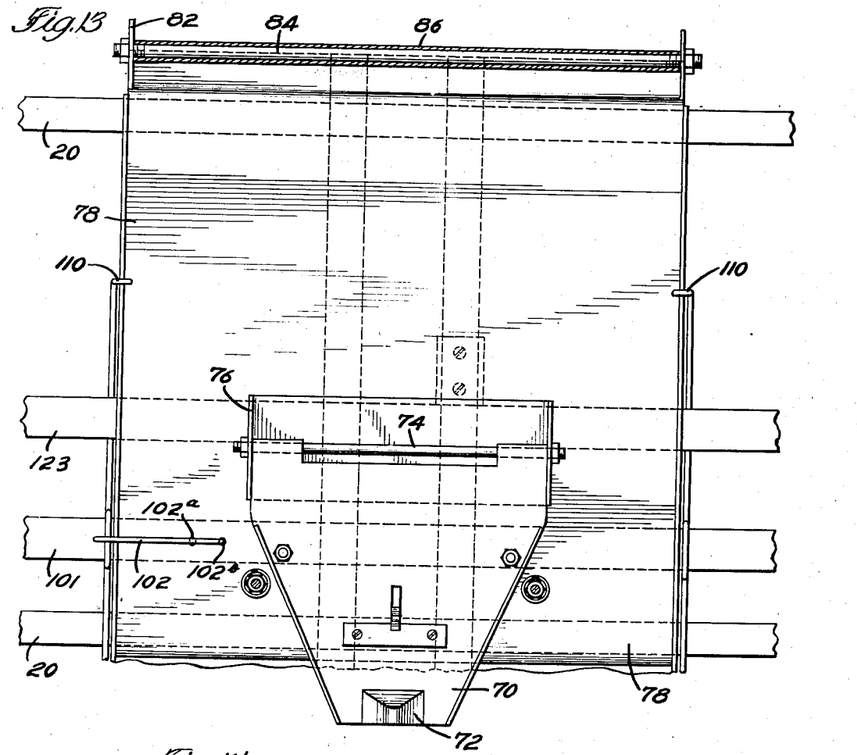
Fig. 13 is a fragmentary plan sectional view taken generally on the line 13—13 of Fig. 12.

The type carrying disc 36 may be mounted upon the carriage 18 at an angle of approximately 45°, and be rotated upon a shaft member 64 secured to the carriage. A toothed centering disc 66 may be positioned directly below the disc 36 and secured to revolve therewith. The disc 66 is formed with a plurality of teeth 68 around its peripheral edge, which are angularly disposed to co-operate with a registering member 70. The registering member 70, as shown in Figs. 12 and 13, is formed with a V-shaped cam member 72, which is adapted to co-operate with the teeth 68. The member 70 is pivotally mounted at its rear end upon a cross-rod 74, carried by a bracket 76.

The carriage 18 is further provided with a base portion 78 which carries the rollers 80 in the side walls thereof that engage in the tracks 20 to support the same. The member 78 has rearwardly extending ears 82, which carry a cross-rod 84, upon which an upright frame member 86 is pivotally mounted. The frame member 86 extends to a position beneath the discs 36 and 66, and is then bent parallel thereto to form a support 87 therefor. A bearing member 88 for the shaft 66 is also attached to the portion 87.

A pointer member 89 is secured to the upper end of shaft 64 in a rigid position, so that it always points toward the indicia 90 on the disc 36 to assist in aligning the opposite indicia beneath the hammer member 50. A scale 60a, which is similar to the scale 60 on the cross bar 52, is provided upon the top 12 at a point adjacent the forward side thereof, so that show-cards to be printed on can be lined up in accordance with the desired spacing of the printing to be done thereon.

Means for inking the type before each printing operation are provided. This means may comprise the inking pads 92a and 92b mounted upon a shelf 78a extending forward from the base portion 78 of the carriage, one of said pads being saturated with red ink and the other of said pads being saturated with black ink. A pair of inking rollers 93a and 93b are provided in contact with each of said inking pads, said inking rollers being mounted upon arms 94a and 94b. Each of said arms is keyed to a pinion 95 adjacent its inner end. The pinions 95 engage rack members 96 spaced apart by a suitable guide member 97. A bracket 98 supports the racks in position, so that they can be moved backward and forward, as will be further described.

Figure 14:
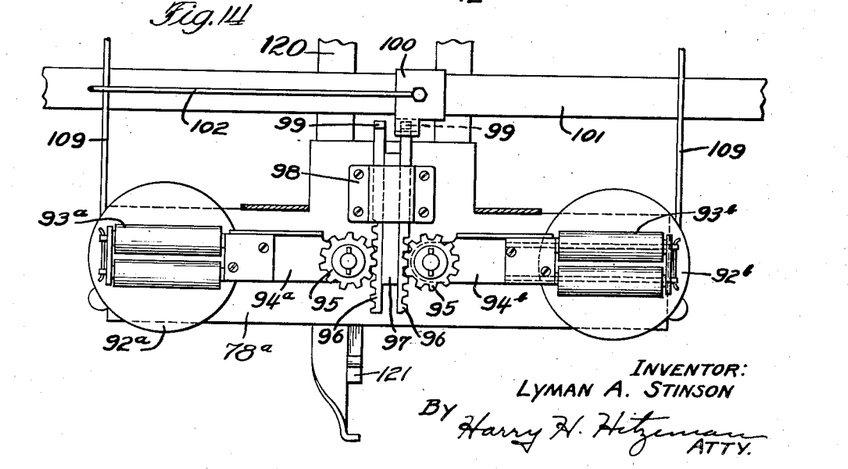
Fig. 14 is a fragmentary plan sectional view showing the inking mechanism, taken generally on the line 14—14 of Fig. 12.

The rear ends of the racks 96 are formed with an upwardly extending finger member 99 adapted to be engaged by a slidable block 100, which is mounted upon the cross bar 101. An arm 102 extends from the block 100 to the left, upwardly, and is then bent back upon itself and formed at its end with a projection to be inserted in either opening 102a or 102b in the bottom wall of the carriage base 78. This construction is clearly shown in Figs. 13 and 14. With the construction as shown, when the bar 101 moves rearwardly, it will carry either one or the other of the racks 96 backwardly and swing either inking roll 93a or inking roll 93b outwardly to ink the type, depending upon whether it is desired to print with red ink or with black ink.

Means for revolving the inking pads 92a and 92b comprise the ratchet wheels 105 and dogs 106, carried by lever arms 107 rotatably mounted upon the inking pad shaft 108. Rods 109 extend rearwardly from levers 107 and are adapted to be rocked by the bar 101 as it is oscillated, thus causing an intermittent rotation of the inking pads 92a and 92b. The rods 109 have their back ends 110 extended upwardly, to slidably engage the sides of platform 78, and are thus adapted to ride thereon.

Figure 15:
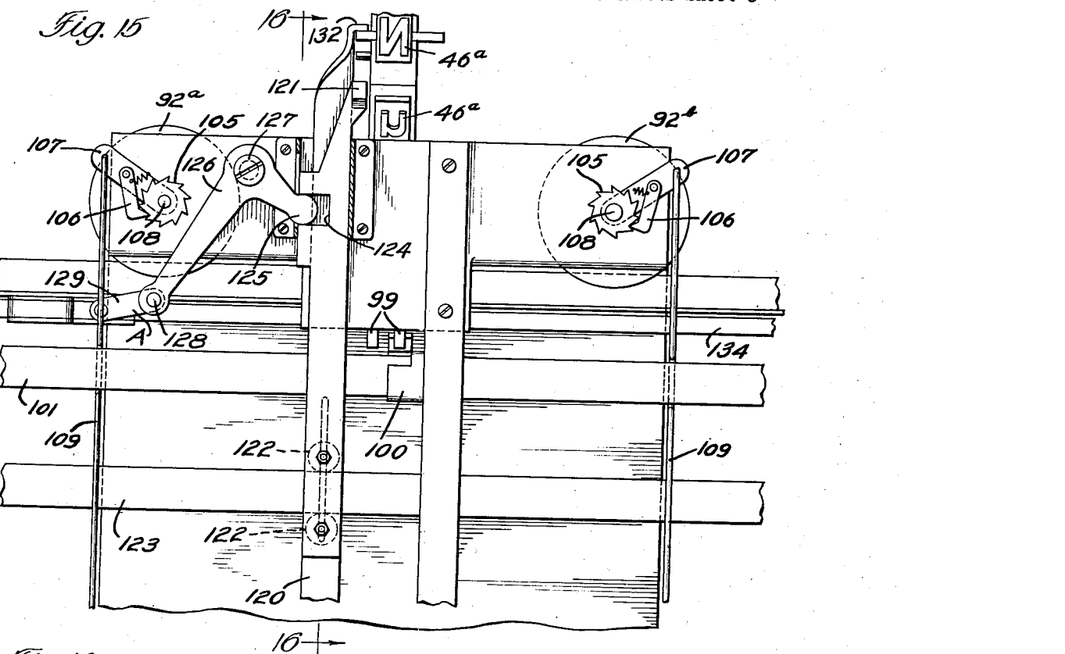
Fig. 15 is a fragmentary bottom plan view showing generally the inking mechanism and associated parts and the spacing mechanism, and is taken generally on the line 15—15 of Fig. 12.
Figure 16:
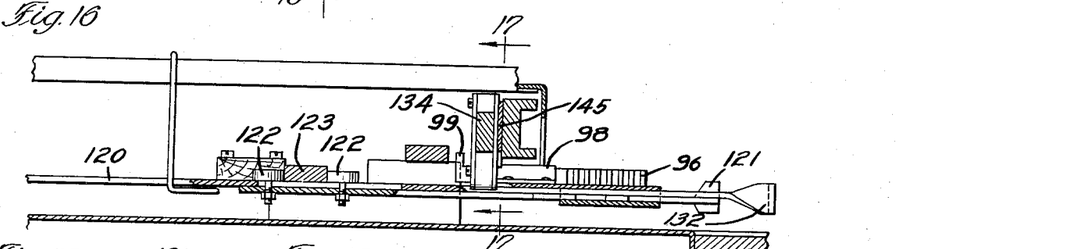
Fig. 16 is a vertical sectional view of the spacing mechanism, taken generally on the line 16—16 of Fig. 15.

Means for spacing the carriage according to the size of the letter just printed is provided. This means may include a spacer bar 120 (Figs. 14, 15, and 16) which comprises a flat bar member formed at its forward end, with a vertical abutment member 121. A pair of rollers 122 are carried thereby adjacent and on opposite sides of a space rocker bar 123, which is adapted to be rocked back and forth by mechanism later to be described. An open ended slot 124 is formed in one side of the spacer bar 120 adjacent its forward end, and the slot is adapted to operatively engage the end 125 of a bell crank lever 126 pivotally mounted at 127 to a portion of the carriage. The opposite end of the bell crank lever 126 is pivotally connected at 128 to a link member 129 which is attached to a pin 130 extending downwardly from a friction clutch member 131 shown in detail in Figs. 17 to 19. A rigid stop finger member 132 extends forward from the carriage beneath the spacer bar 120, and extends beyond the same in a fixed position approximately in line with the hammer member 50. As most clearly shown in Figs. 12 and 15, the purpose of the stop finger member 132 is to engage the extensions 46b of the individual type members 46 which extend beyond the slots 42 in the type holder 38.

It will be noted that the lower edge of the extensions 46b is rounded, so that, as the same descends under the force of hammer 50, if it is not in exact vertical alignment, the stop finger 132 will align the same. The abutment member 121 on the spacer bar 120 is moved forward to engage the pin member 38a which extends horizontally from each type carrier 38 adjacent the member 46b of the individual type members. The pins 38a are placed in different positions, spaced from the slots 42 depending upon the width of the individual type 46a. For example, in Fig. 15, the letter N is shown in caps of a certain width, and the letter n is shown as of a narrower width; and the pin members 38 are so spaced with relation to the width of the letters that they will permit forward movement of abutment 121 only the same distance as the width of the letter which is being printed. In this manner, an even spacing is assured, depending entirely upon the width of the particular letter which is being printed.

The manner in which the carriage is pulled forward, according to the action of abutment 121 and the spacer bar, will now be explained. The bell crank lever 126 is rocked a specified distance by each movement of the spacer bar, and this movement is transmitted to the friction clutch 131, which is so constructed that, upon the reverse stroke of the spacer bar, the printing carriage is moved forward along the rails 20, fulcrumed on the cross rod 134, which is a vertical rod rigidly mounted on the frame, and extends horizontally across the platform thereof.

The clutch member 131 may comprise the side plates 135 and an intermediate block formed of the upper member 136 and a lower member 136a. These members are placed above and below the cross rod 134 and the entire assembly is held together by the fastening bolts 137. The slip friction means may comprise a roller 138 which is yieldingly held in frictional engagement with the lower wall of cross rod 134 by a spring 139 and block member 140, which are mounted in a rectangular slot 141 formed in the lower housing member 136a.

Figures 18, 19:
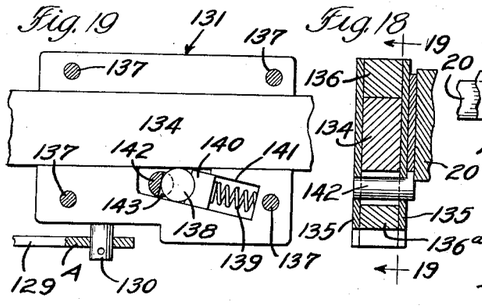
Fig. 18 is a vertical sectional view of the same mechanism taken on the line 18—18 of Fig. 17.
Fig. 19 is a fragmentary view of the spacing clutch.

As shown in Fig. 19, the clutch member 131 is effectively held against movement to the left by the frictional engagement of roller 138 and the bottom of cross rod 134. Means for releasing this frictional engagement for a spacing operation may comprise the bolt member 142 which is mounted in the side plate members 135 and is provided with a cutaway portion 143 within which frictional roller 138 is positioned. The cutaway portion is so formed that rotation in a clockwise direction of the bolt 142 will move roller 138 out of frictional engagement with the cross rod 134.

Figure 17:
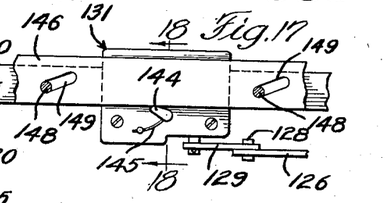
Fig. 17 is a vertical sectional view illustrating the clutch means for the spacing device, and is taken on the line 17—17 of Fig. 16.

The bolt 142 carries at one outer end an extension 144, against which a resilient member 145 is normally pressing to hold the same in the position shown in Fig. 17, in which position the cross rod and the clutch are in frictional engagement. Means for actuating the extension 144 comprise the vertical bar 146, which extends horizontally across the machine and is supported upon a pair of pins 148 carried by the cross rail 20. The pins 148 ride in elongated slots 149, which are placed at an angle, so that a pull upon one end of the vertical bar 146 will move the same sidewise and downwardly, thus rotating bolt 142 and releasing the clutch.

A lever 103 (see Fig. 2) is connected to the left-hand of member 146 and a spring member 150 connected to the rail 20 is connected to the right-hand of member 146 for returning the same to its usual position. The link 103 is connected to a clutch release lever 104 mounted at the side of the machine and pivoted at its outer end to a portion of the back rail 20.

The mechanism for connecting the power means with the various operating devices will now be described. This mechanism is most clearly shown in Figs. 3 to 10, inclusive. The power means may comprise any suitable or desirable type of motor 160, which is mounted upon a pair of cross bars 161 in the base directly beneath the printing table 12. The motor is adapted to drive a shaft 162, by means of pulleys 163 and 164 and a belt 165 suitably connected between said pulleys. A fly wheel 166 may be keyed to shaft 160 at a point intermediate its ends to provide for smoothness of operation.

A pinion gear 167 is keyed to shaft 162 and adapted to engage a gear 168 mounted upon a cross shaft 169, which is suitably journaled at its ends in bearing members 170 at opposite sides of the machine.

Figure 9:
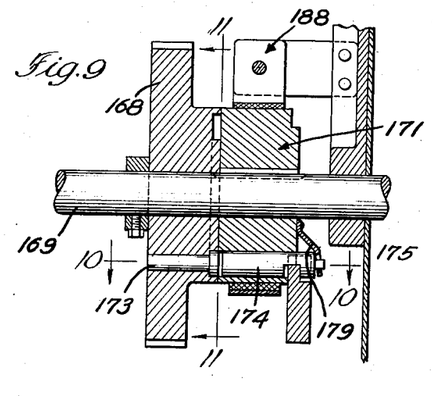
Fig. 9 is a vertical sectional view through the clutch mechanism, taken on the line 9—9 of Fig. 8.
Figure 10:
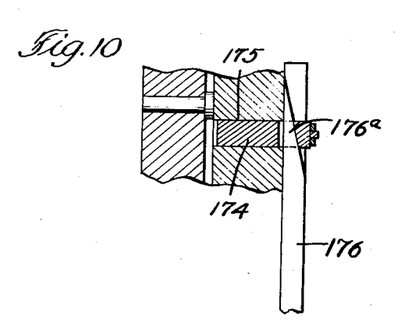
Fig. 10 is a plan sectional view through a portion of the clutch mechanism, taken on the line 10—10 of Fig. 9.
Figure 11:
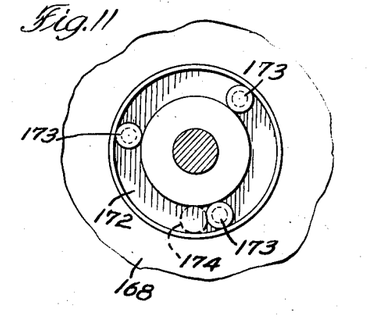
Fig. 11 is a vertical sectional view of a portion of the clutch members taken on the line 11—11 of Fig. 9.

The gear 168, as shown in Figs. 8 to 11, is loosely mounted on cross shaft 169, and driving engagement between the gear and shaft is made by means of a clutch member 171. Gear 168 is formed with an annular groove 172 within which a plurality of pins 173 are mounted, each of these pins being provided with a head of a size to fill the groove 172. The clutch member 171 carries a pin member 174 slidably mounted in an opening 175 therein. This pin is normally held in the position shown in Fig. 9 by a blade member 176 pivotally mounted on a pin 177 extending from the bearing 170. A spring member 178 normally holds the blade 176 in the position shown in Figs. 8 and 9, thus effectively preventing engagement of the clutch pins. The outer end of pin 174 is operatively connected to a spring member 179, which normally forces the pin to the right, as shown in Fig. 9.

Means for releasing the blade 176 from engagement with the pin 174 comprise the lever member 180, pivotally mounted upon a shaft 181, which extends cross-wise of the machine. The lever 180 is normally held in the position shown in the drawings by a spring member 182, and is actuated by downward pressure upon the clutch handle 183, which is connected, by means of levers 184 and 185, to the shaft 181. The downward pressure rotates the shaft 181, bringing the abutment 186 of lever 180 against a pin 187 on the side of blade member 176, thus swinging the end 176a thereof out of engagement with the pin 174, and allowing the same to enter the groove 172 and make a connection to revolve the shaft 169. The blade 176 is so formed that, upon releasing the clutch handle 183, the same will withdraw the pin 174, by means of the cam-shaped portion 176a thereof, and disengage the connection between the gear and the shaft 169.

A brake member 188, supported upon the side of the machine, is attached to the clutch member 171, to provide a quick stopping of the rotation thereof when the clutch is disengaged from the gear. The brake member may be of the usual type, provided for such purposes, and may be yieldingly adjustable, as shown. The shaft 169 may carry at its outer ends a pair of crank members 189, which are pivotally connected by a pin 190 to a pair of cross heads 191, which are slidably mounted in the horizontal guide members 192. The guide members 192 are rigidly attached to the lower end of the side brackets 54, which carry the cross bar 52, upon which the hammer is mounted. Suitable casings 193 upon the sides of the machine carry the brackets so that a single rotation of shaft 169 will bring the hammer and associated parts downwardly for a printing operation and then return them to normal position.

The cross bars 101 and rocker bar 123 are reciprocated by a pair of levers 200 and 201 pivotally mounted upon the ends of a pair of cross shafts 202 and 203. A link 204 extends downwardly from shaft 202 and is connected at its lower end to a lever 205 which is formed with an elongated slot 206 within which shaft 169 rotates. The link carries at its outer end a cam roll 207 adapted to ride upon a face cam 208 keyed to shaft 169. A spring member 209 is connected between the lower end of link 204 and cross bar 161, for the purpose of co-operating with the cam 208 to provide a reciprocatory movement for the spacer rocker bar 123.

A link 210 may extend downwardly from cross shaft 203, and be pivotally connected at its lower end with a lever 211, which is formed with a forked end 212 to engage the drive shaft 169 within the fork. Roller 213 is mounted on the lever 211 at a point adjacent the shaft 169, and is adapted to engage a face cam 214, which is keyed to the shaft 169 adjacent the lever 211. A spring member 215 is connected between the lower end of link 210 and the housing of the machine, for the purpose of co-operating with the cam and motor described, to effect a reciprocatory motion of the cross bar 101.

I claim:

1. Show card printing apparatus comprising a base, a card supporting platform thereon, a type carrying disc mounted above said platform at an angle of 45°, individual type members thereon, means for selecting any one of said type members for operation, and power means including a resiliently mounted hammer for moving a selected type member to printing position.

2. Show card printing apparatus comprising a base member, a card supporting platform thereon, means for holding the card for a printing operation, a rotatable type carrying disc mounted above said platform at an angle of 45°, individual type carriers thereon, means for moving said disc back and forth above said card supporting platform, and power means including a resiliently mounted hammer for operating an individual type carrier in a printing operation.

3. Show card printing apparatus comprising a rectangular base member, a horizontal top thereon, a card supporting platform forming a part thereof, a pair of parallel rails mounted above said top, a carriage movably supported thereon, a type carrying disc positioned at an angle of 45° on said carriage, individual type carriers rotatably mounted around the periphery of said disc, a plurality of individual type on each carrier, power operated means including a hammer for pressing and forcing an individual type against a cardboard in a printing operation, a hand control for actuating said power means and automatic spacer means for selecting the location of the next printing operation.

4. Apparatus of the class described comprising a rectangular frame, a work supporting platform thereon, means for holding a show card on said platform, a revolvable type carrying disc, an individual type registering disc, a pair of spaced rails on said frame, said type carrying disc and said centering disc supported by rollers on said rails, individual type on said disc, power operated means including a hammer for pressing one of said individual type in a printing operation and automatic spacer means for selecting the location of the next printing operation.

5. Apparatus of the class described, comprising a rectangular frame, a work supporting platform thereon, means for holding a show card on said platform, a revolvable type carrying disc mounted at an angle above said platform, an individual type registering disc associated therewith, a pair of spaced rails on said frame, said type carrying disc and said registering disc supported by rollers on said rails, individual type on said disc, power operated means including a hammer for pressing on of said individual type in a printing operation, and spacing means including a slip clutch for moving said type carriage for a subsequent printing operation.

6. Show card printing apparatus comprising a rectangular base member, a horizontal top thereon, a card supporting platform forming a part thereof, a pair of parallel rails mounted above said top, a carriage movably supported thereon, a type carrying disc on said carriage, individual type carriers mounted around the periphery of said disc, a plurality of individual type on each carrier, power operated means including a hammer for pressing an individual type against a cardboard in a printing operation, a hand control for actuating said power means, and automatic slip clutch means for advancing or spacing the type carrier for the next operation.

7. Show card printing apparatus comprising a rectangular base member, a horizontal top thereon, a card supporting platform forming a part thereof, a pair of parallel rails mounted above said top, a carriage movably supported thereon, a type carrying disc on said carriage, individual type carriers mounted around the periphery of said disc, a plurality of individual type on each carrier, inking means for said type, a power operated hammer for pressing an individual type against a cardboard after inking in a printing operation, a hand control for actuating said power hammer, and automatic means for advancing or spacing the type carrier for the next operation.

8. Show card printing apparatus comprising a base member, a horizontal top thereon, a card supporting platform forming a part thereof, indicia for placing said card in a desired location, a carriage movably supported above said card platform, a rotatable disc mounted on said carriage, a plurality of individual type carriers mounted around the periphery of said disc, selective inking means for said type, a power hammer for pressing an individual type against a card after being inked for a printing operation, a hand control for said power hammer, and means for spacing the type carrier according to the size of the type.

9. Show card printing apparatus comprising a base member, a horizontal top thereon, a card supporting platform forming a part thereof, indicia for placing said card in a desired location, a carriage movably supported above said card platform, a rotatable disc mounted on said carriage, a plurality of individual type carriers mounted around the periphery of said disc, a type centering disc associated with said rotatable disc, selective inking means for said type, a power operated hammer for forcing an individual type against a card after being inked for a printing operation, a hand control for said power hammer, and means for spacing the type carrier according to the size of the type.

10. Show card printing apparatus comprising a base member, a horizontal top thereon, a card supporting platform forming a part thereof, indicia for placing said card in a desired location, a carriage movably supported above said card platform, a rotatable disc mounted on said carriage, a plurality of individual type carriers mounted around the periphery of said disc, a type registering disc associated with said rotatable disc, a fixed indicating arrow thereabove, selective inking means for said type, a power operated hammer for pressing an individual type against a card after being inked for a printing operation, a hand control for said power hammer, and means for spacing the type carrier according to the size of the type.

11. Show card printing apparatus comprising a rectangular base member, a horizontal top thereon, a card supporting platform forming a part thereof, a pair of parallel rails mounted above said top, a carriage movably supported thereon, a type carrying disc on said carriage, individual type carriers mounted around the periphery of said disc, a plurality of individual type on each carrier, means for registering a type member for a printing operation comprising a toothed disc member secured to said type carrying disc and a V-shaped engaging member carried by said carriage, inking means for said type, a power operated hammer for pressing an individual type against a cardboard after inking in a printing operation, a hand control for actuating said power hammer, and automatic means for advancing or spacing the type carrier a desired distance for the next operation.

12. Show card printing apparatus comprising a base, a card supporting platform thereon, a type carrying disc rotatably mounted above said platform at an angle of 45°, individual type members mounted thereon, means for selecting any one of said type members for operation, power means including a resiliently mounted hammer for moving a selected type member to printing position and spacer means for moving said disc to print a certain distance from the last print.

13. Show card printing apparatus comprising a base member, a card supporting platform thereon, means for holding the card for a printing operation, a rotatable type carrying disc mounted above said platform at an angle of 45°, individual type carriers thereon, means for moving said disc back and forth above said card supporting platform, power means including a resiliently mounted hammer for operating an individual type carrier in a printing operation and spacer means for moving said disc to print a set distance from the first print, depending upon the size of the letter being printed.

14. In apparatus of the type described, type carrier disc construction including a pivotally mounted support bracket, a flat disc secured thereto, a toothed centering disc secured therebeneath, a pivotally mounted registering member adapted to co-operate with said centering disc, a plurality of brackets secured to the edge of said first named disc and extending beyond the edge, type carrying discs pivotally mounted upon said brackets, each of said type carrying discs having several removable type members attached thereto on different sides and co-operating means between said brackets and said type carrying discs for holding a desired type member in printing position.

15. In apparatus of the type described, type carrier disc construction including a pivotally mounted support bracket, a flat disc secured thereto, a toothed centering disc secured therebeneath, a pivotally mounted registering member adapted to co-operate with said centering disc, a plurality of brackets secured to the edge of said first named disc and extending beyond the edge, type carrying discs pivotally mounted upon said brackets, each of said type carrying discs having several removable type members attached thereto on different sides and co-operating means between said brackets and said type carrying discs for holding a desired type member in printing position, said means including a bump on each bracket and spaced openings on the side of each type carrying disc.

16. In apparatus of the type described, type carrier disc construction including a pivotally mounted support bracket, a flat disc secured thereto, a toothed centering disc secured therebeneath, a pivotally mounted registering member adapted to co-operate with said centering disc, a plurality of brackets secured to the edge of said first named disc and extending beyond the edge, type carrying discs pivotally mounted upon said brackets, each of said type carrying discs having several removable type members attached thereto on different sides and co-operating means between said brackets and said type carrying discs for holding a desired type member in printing position, said type carrying discs having slots and said type members having lugs engageable in said slots to position the same.

17. In apparatus of the type described, type carrier disc construction including a pivotally mounted support bracket, a flat disc secured thereto, a toothed centering disc secured therebeneath, a pivotally mounted registering member adapted to co-operate with said centering disc, a plurality of brackets secured to the edge of said first named disc and extending beyond the edge, type carrying discs pivotally mounted upon said brackets, each of said type carrying discs having several removable type members attached thereto on different sides and co-operating means between said brackets and said type carrying discs for holding a desired type member in printing position and spacer means adapted to co-operate with the type member in printing position to move the type carrier disc forward the required distance.

18. Show card printing apparatus comprising a base member, a card supporting platform thereon, means for holding the card for a printing operation, a rotatable type carrying disc mounted above said platform at an angle of 45°, individual type carriers thereon, said type carriers pivotally mounted about the periphery of said disc, sockets around the edge of said type carriers, individual type members mounted in said sockets, means for moving said disc back and forth above said card supporting platform, and power means including a resiliently mounted hammer for operating an individual type carrier in a printing operation.

LYMAN A. STINSON.